(12) United States Patent
Blum et al.

(10) Patent No.: US 11,428,167 B2
(45) Date of Patent: Aug. 30, 2022

(54) HEAT EXCHANGER FOR A TURBOMACHINE

(71) Applicant: Safran Aircraft Engines, Paris (FR)

(72) Inventors: Hervé Eugène Blum, Moissy-Cramayel (FR); Lancelot Guillou, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 34 days.

(21) Appl. No.: 17/264,643

(22) PCT Filed: Jul. 30, 2019

(86) PCT No.: PCT/FR2019/051870
§ 371 (c)(1),
(2) Date: Jan. 29, 2021

(87) PCT Pub. No.: WO2020/025894
PCT Pub. Date: Feb. 6, 2020

(65) Prior Publication Data
US 2021/0310410 A1 Oct. 7, 2021

(30) Foreign Application Priority Data
Jul. 31, 2018 (FR) ...................................... 1857153

(51) Int. Cl.
*F02C 7/14* (2006.01)
*F28F 3/12* (2006.01)
(Continued)

(52) U.S. Cl.
CPC .................. *F02C 7/14* (2013.01); *F28F 3/12* (2013.01); *F05D 2220/323* (2013.01);
(Continued)

(58) Field of Classification Search
CPC . F02C 7/14; F28F 3/12; F28F 2230/00; F05D 2220/323; F05D 2260/213;
(Continued)

(56) References Cited

U.S. PATENT DOCUMENTS

2015/0135726 A1  5/2015 Hundley, Jr. et al.
2016/0348548 A1* 12/2016 Borghese ................ F28F 27/02
(Continued)

FOREIGN PATENT DOCUMENTS

FR          3060057 A1    6/2018

OTHER PUBLICATIONS

International Search Report and Written Opinion dated Oct. 17, 2019, issued in corresponding International Application No. PCT/FR2019/051870, filed Jul. 30, 2019, 8 pages.

*Primary Examiner* — Tho V Duong
(74) *Attorney, Agent, or Firm* — Christensen O'Connor Johnson Kindness PLLC

(57) ABSTRACT

An annular heat exchanger with a longitudinal axis for a turbomachine, intended for example to be supported by an annular shell of a casing of the turbomachine, includes a one-piece annular part having a first fluidic circuit having at least one first conduit and at least one second conduit extending annularly and a second fluidic circuit having at least one first conduit and at least one second conduit extending annularly and arranged in a direction perpendicular to the longitudinal direction on either side of the first conduit and second conduit of the first circuit.

6 Claims, 4 Drawing Sheets

(51) Int. Cl.
*F28D 21/00* (2006.01)
*F28D 7/00* (2006.01)

(52) U.S. Cl.
CPC ...... *F05D 2260/213* (2013.01); *F28D 7/0066* (2013.01); *F28D 2021/0021* (2013.01); *F28D 2021/0026* (2013.01); *F28D 2021/0049* (2013.01); *F28F 2230/00* (2013.01)

(58) Field of Classification Search
CPC .......... F28D 7/0066; F28D 2021/0021; F28D 2021/0026; F28D 2021/0049
See application file for complete search history.

(56) References Cited

U.S. PATENT DOCUMENTS

| | | | |
|---|---|---|---|
| 2017/0184028 A1* | 6/2017 | Sennoun | F02C 7/12 |
| 2017/0211478 A1* | 7/2017 | Storage | F02K 3/06 |
| 2018/0328285 A1* | 11/2018 | Tajiri | F28D 1/05341 |
| 2018/0347468 A1* | 12/2018 | Caimano | F28F 9/0265 |
| 2019/0390602 A1* | 12/2019 | Potel | F02C 7/06 |
| 2020/0200040 A1* | 6/2020 | Jiang | F02C 7/14 |

\* cited by examiner

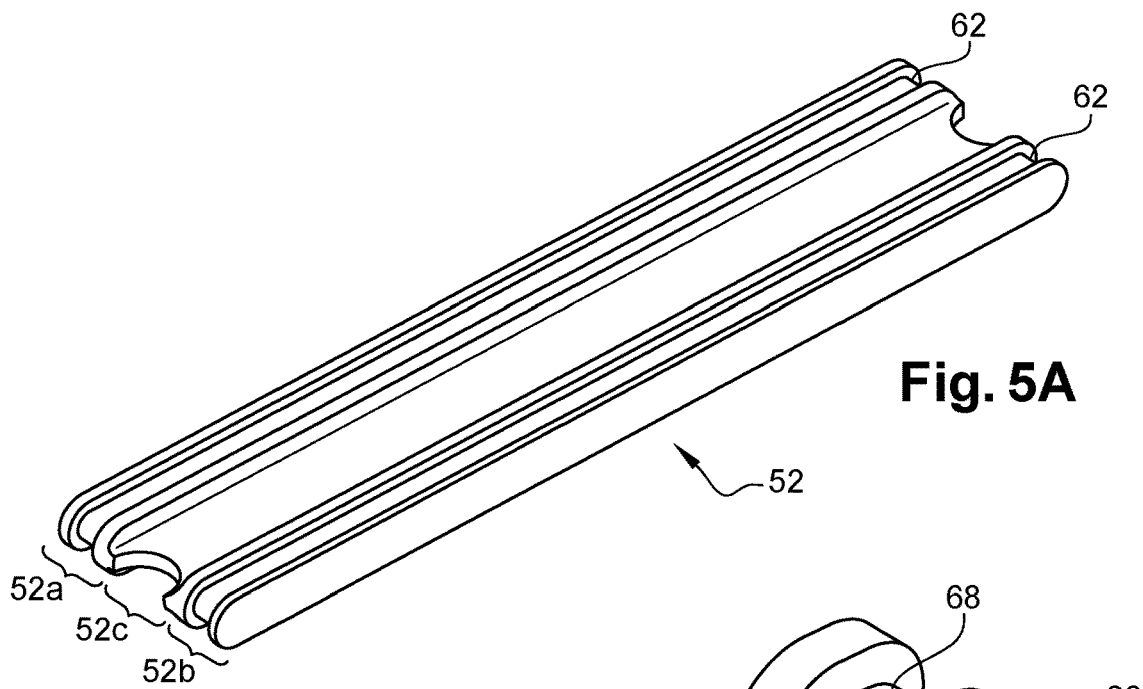
Fig. 5A
Fig. 5B
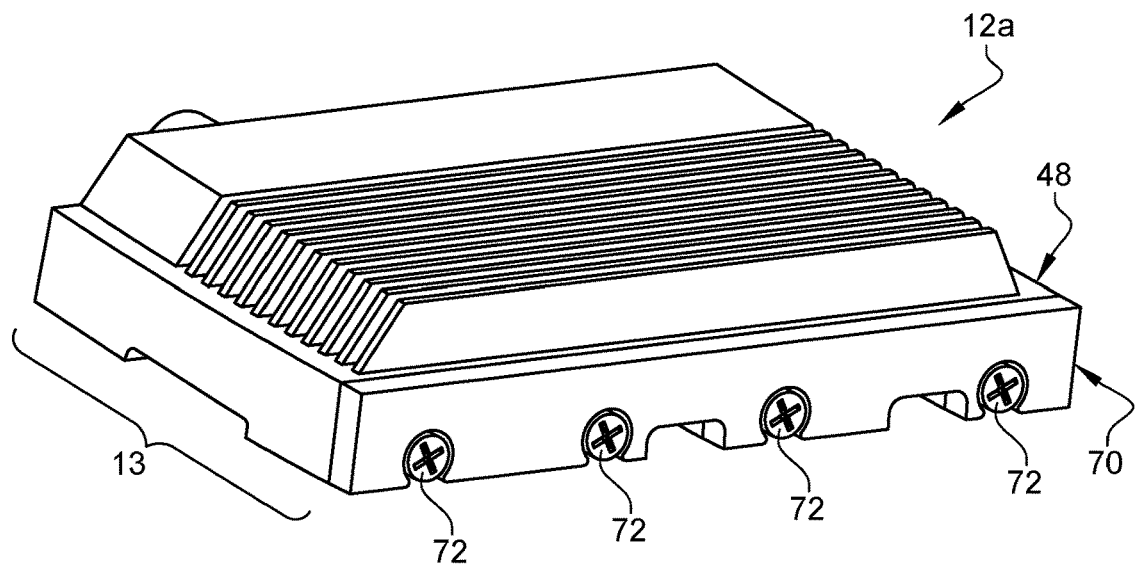
Fig. 6

HEAT EXCHANGER FOR A TURBOMACHINE

FIELD OF THE INVENTION

The present invention relates to a heat exchanger and more particularly the cooling of the oil in an aircraft engine.

BACKGROUND OF THE INVENTION

FIG. 1 represents a turbomachine 10 with double flow which comprises moving parts which rub against other moving parts or against fixed parts, this connection is for example a bearing. In order not to break due to heating due to friction, the parts are sprayed with oil which allows on the one hand to limit (or contain) their heating and, on the other hand, to lubricate them to facilitate the sliding of the parts on top of each other.

The oil circulates in a circuit provided with heat exchangers, in particular oil/air exchangers 12, as shown in FIG. 2, having a matrix, in the form of a sinuous pipe shaped so as to carry out an exchange of heat, in which the oil from said parts is introduced then cooled before being injected again on said parts. The heat exchanger 12 shown in FIG. 2 is an annular heat exchanger 12 which is mounted on the radially internal or external face (relative to the longitudinal axis 14 of the turbomachine) of an annular ferrule 16 delimiting radially outwards or inside an annular vein for the flow of a secondary air flow.

FIG. 3 shows schematically the principle of circulation of a fluid to be cooled, in particular oil, in the heat exchanger 12 as shown in FIG. 2. The heat exchanger 12 comprises a annular part 18 comprising a first circuit 20 formed of first conduits 22 and second conduits 24 for the circulation of oil to be cooled and a second circuit 26 formed of a first conduit 28 and a second conduit 30 for the circulation of oil thawing the first 22 and second 24 conduits of the first circuit 20. The exchanger 12 is an annular exchanger which extends around the axis 14 of the turbomachine. In FIG. 3 are shown the longitudinal dimension of the exchanger 12 in the direction L and the circumferential dimension of the exchanger 12 in the direction C.

As can be seen, the first conduits 22 of the first circuit 20 include first portions 22a which extend between a fluid inlet 32 and a first fluid connection member 34a and second portions 22b which extend between a second fluid connection member 34b and an outlet 36 for fluid. The second conduits 24 of the first circuit 20 extend between the first fluid connection member 34a and the second fluid connection member 34b. In this way, the oil flows from the fluid inlet 32, in the first portions 22a of the first conduits 22, in the first fluid connection member 34a, in the second conduits 24 of the first circuit 20, in the second member 34b for fluid connection, in the second portions 22b of the first conduits 22 then towards the outlet 36 for oil.

The first conduit 28 of the second circuit 26 comprises a first portion 28a which extends between the fluid inlet 32 and the first member 34a for fluid connection and a second portion 28b which extends between the second member 34b of fluid connection and the outlet 36 of fluid.

The second conduit 30 of the second circuit 26 extends between the first fluid connection member 34a and the second fluid connection member 34b. In this way, the oil flows from the fluid inlet 32, into the first portion 28a of the first conduit 28, into the first fluid connection member 34a, into the second conduit 30, into the second connection member 34b fluid, in the second portion 28b of the first conduit 28 of the second circuit 26 then to the oil outlet 36. Thus shaped, the oil of the second circuit 26 can allow thawing of the first circuit 20 when necessary.

As can be seen, the connecting members 34a, 34b thus used to make the fluid connection between the first conduits 22, 28 and the second conduits 24, 30 of the first circuit 20 and of the second circuit 26. However, these parts are complicated to achieve since they must include oil recirculation channels. In addition, due to the structural independence of these connecting members 34a, 34b, it is necessary to fix them by welding or brazing to the annular part, which requires particular vigilance since it is imperative that no welding or brazing does not block, even partially, the flow of oil in the first circuit 20 or the second circuit 26. It is therefore necessary to set up quality control operations which are long and costly. Furthermore, the fixing of these connecting members 34a, 34b makes them non-removable, which is not practical when it is desired to be able to simply inspect the first circuit 20 and the second circuit 26. Finally, given the location of the heat exchanger 12 of the annular air flow path, it is essential that its radial dimension is limited so as not to have to modify the diameter of the shell, which would necessarily impact the other parts which are fixed to it.

The purpose of the proposed invention is in particular to provide a simple and effective solution to the aforementioned problems of the prior art.

SUMMARY OF THE INVENTION

Is proposed an annular heat exchanger of longitudinal axis for a turbomachine, intended for example to be supported by an annular shell of a casing of the turbomachine, comprising a monobloc annular part comprising a first fluidic circuit comprising at least a first conduit and at least a second conduit extending annularly, and a second fluidic circuit comprising at least a first conduit and at least a second conduit extending annularly and arranged in a direction perpendicular to the longitudinal direction on either side of the first conduit and second conduit of the first circuit, characterized in that the first and second conduits of the first circuit and the first and second conduits of the second circuit open onto a first end of the said annular part into a cavity which itself opens in the circumferential direction and into which a first sealing member is inserted which is shaped so as to:

delimit, with the annular part, at least a first fluid connection channel of the first conduit of the first circuit with the second conduit of the first circuit, and delimit, with the annular part, at least one second fluidic connecting channel of the first conduit of the second circuit with the second conduit of the second circuit, the second connecting channel being fluidically independent of the first connecting channel.

According to the invention, the fluid connection at one end of the exchanger is made directly inside the annular part since the first circuit and the second circuit are formed in it. In contrast to the previous technique, there is no need for welded or brazed connection parts. In addition, the conformation of the first sealing member so as to allow fluid continuity within the first circuit and the second circuit simplifies the assembly operation, as only one member is required at this point. This assembly is also very compact.

According to another possible characteristic, the first sealing member has external grooves in which seals are engaged.

In addition, the first sealing member may comprise a wall extending in said direction perpendicular to the longitudinal direction and delimiting, with the annular part, two substantially parallel second connecting channels.

In addition, one of the two second channels can be arranged radially outside the other of the two second channels and are separated fluidly from each other by a wall of the first sealing member.

Also, the first member can be locked in position in the cavity by a plate applied at the circumferential end of said ring portion. This plate can be made integral with the annular part, by screwing for example.

Finally, the first and second conduits of the second circuit can be closed off by second organs at their ends opening circumferentially at the first end of the annular part. These second organs can be held in position by the above-mentioned plate.

The invention will be better understood and other details, characteristics and advantages of the invention will appear when reading the following description, which is given as a non-limiting example, with reference to the attached drawings.

BRIEF DESCRIPTION OF THE FIGURES

FIGS. 5A and 5B are schematic perspective views of sealing members mounted on said end of the heat exchanger;

FIG. 6 is a schematic perspective view of the first end of the exchanger with another sealing plate mounted on said end;

DETAILED DESCRIPTION

Figure 1:
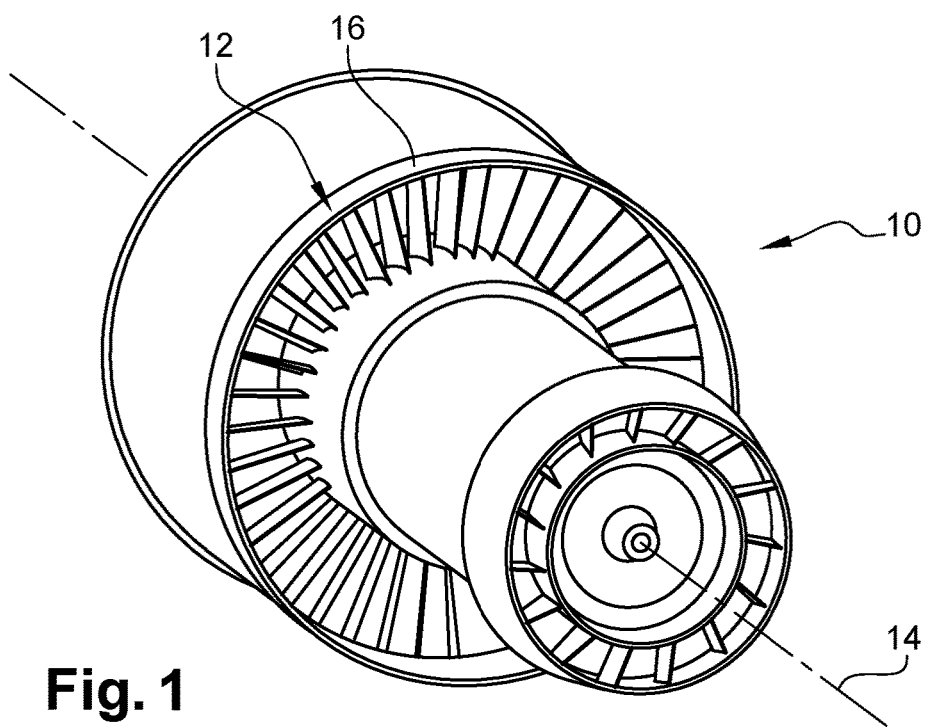
FIG. 1 is a schematic perspective view of a turbomachine according to the known technique.
Figure 2:
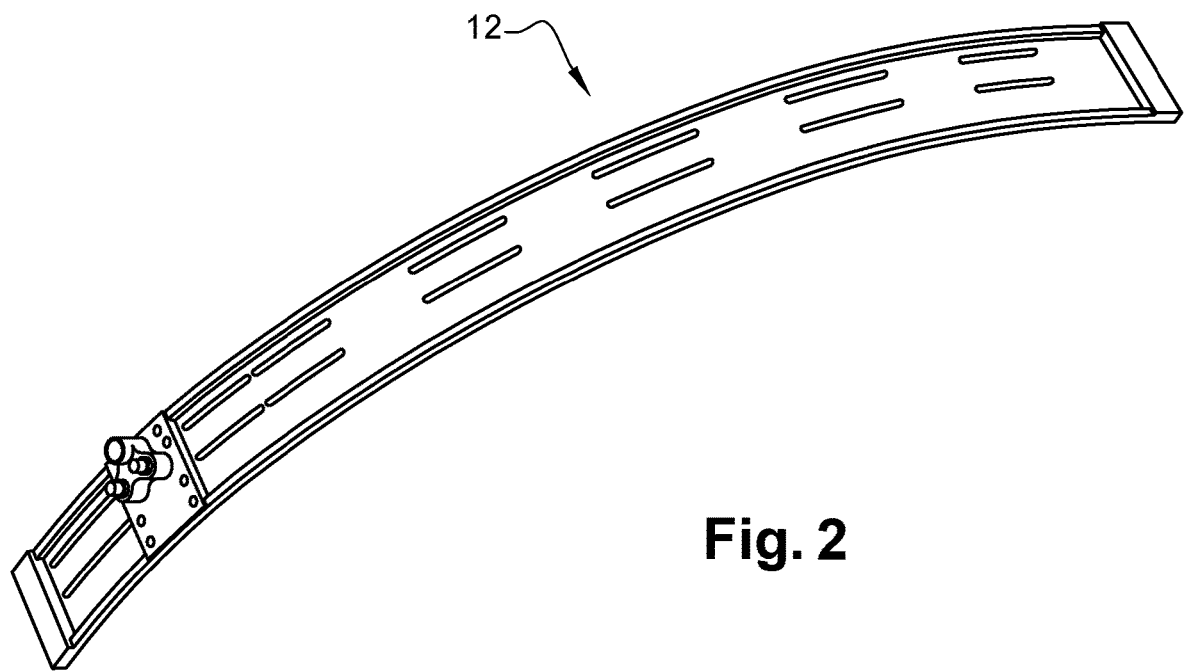
FIG. 2 is a schematic perspective view of a portion of an annular heat exchanger mounted in the turbomachine of FIG. 1.
Figure 3:
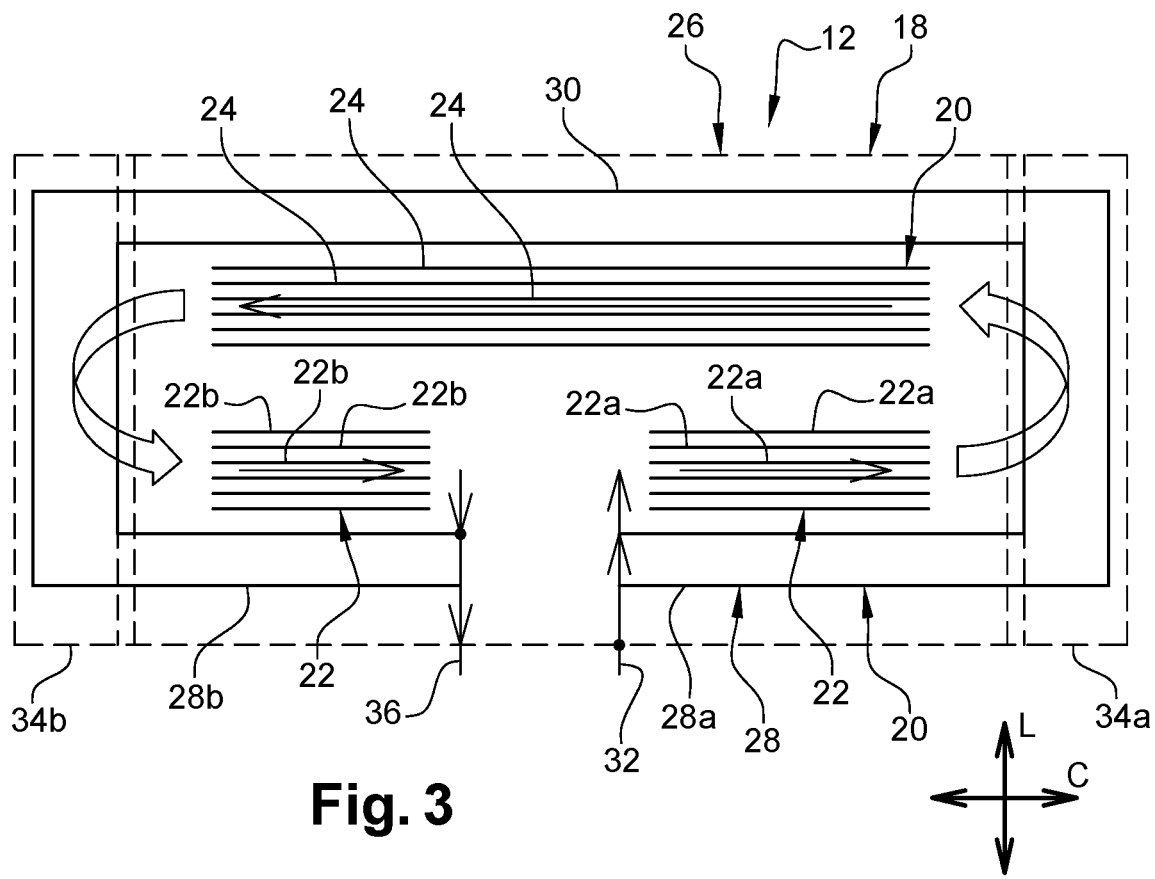
FIG. 3 is a schematic illustration of the exchanger of FIG. 2 and the flow of oil therein.
Figure 4:
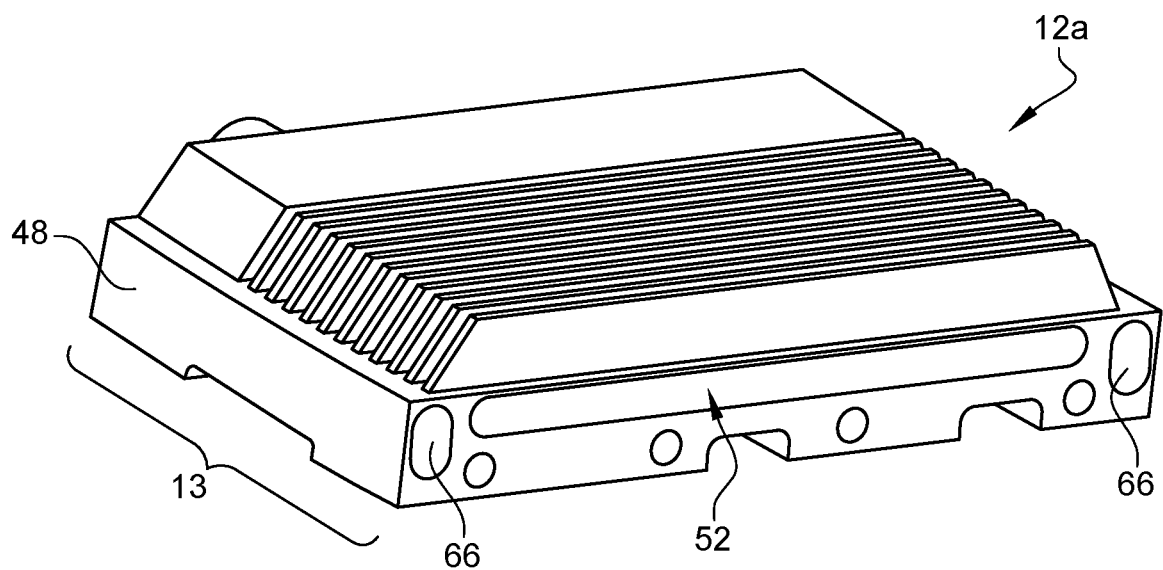
FIG. 4 is a schematic perspective view of a first end of a heat exchanger according to the invention.

Reference is now made to FIGS. 4 to 8 which represent a heat exchanger according to the invention. Similarly to what has been described with reference to FIG. 3, the exchanger 12a also comprises a first fluidic circuit 37 of oil comprising a plurality of first conduits 38 and second conduits 40 substantially parallel to each other, the first conduits 38 comprising first and second portions 38a. The exchanger 12a also comprises a second thawing fluid circuit 42 comprising a first conduit 44 and a second conduit 46 which are parallel, the first conduit 44 comprising a first portion 44a and a second portion.

The first conduits 38, 44 and second conduits 40, 42 of the first and second circuits 37, 42 are quite similar to what has been described previously with reference to FIG. 3 and differ from them only in their fluid connection to each other at the circumferential ends of the heat exchanger. Also, what will be described with reference to the first circumferential end 13 of the heat exchanger 12a is also valid for the second opposite circumferential end. Thus, the description will be made and shown only in relation to the first circumferential end 13 of the exchanger 12a using the second portion of the first conduit 38 of the first circuit 37 and the second conduit 40 of the first circuit 37 as well as using the second portion of the first conduit 38 and the second conduit 46 of the second circuit 42.

The invention therefore proposes to provide a fluid connection of the first conduits 38 and second conduits 40 of the first circuit 37 and the fluid connection of the first conduit 44 and the second conduit 46 of the second circuit 42 without having to use a member structurally independent connection of the annular part 48 of the heat exchanger.

In order to achieve, the heat exchanger, we first of all obtain a preform of the annular part 48 of the exchanger 12a which is made of a material which is a good conductor of heat, for example, an aluminium alloy. For this, a die is used to obtain simultaneously the first conduit 38 and the second conduit 40 of the first circuit 37 and the first conduit 44 and the second conduit 46 of the second circuit 42. At the end of this stage, the first conduits 38, 44 and second conduits 40, 46 of the first 37 and second 42 circuits extend from the first end 13 to the second end of the annular part 48 and open in a circumferential direction at the said ends. In a further step, a cavity is formed in the radial thickness of the annular part 48, the cavity being delineated by dotted lines in FIG. 8 and referenced 50. The second portions 38a of the first conduits 38 and the second conduits 40 of the first circuit 37 lead into this cavity. Also, since the first portion 44a of the first conduit 44 of the second circuit 42 and the second conduit 46 of the second circuit 42 opens only circumferentially at the level of the circumferential end face of the annular part 48, lateral bores 54 are made allowing the first portion 44a of the first conduit 44 of the second circuit 42 as well as the second conduit 46 of the second circuit 42 to communicate with the aforementioned cavity 50.

In order to allow an independent oil circulation between the first circuit 37 and the second circuit 42 at the first end 13, a first sealing element 52 is added which is shaped in a special way, i.e.:

to delimit with the annular part 48 at least a first fluid connection channel 55 of the first conduit 38 of the first circuit 37 with the second conduit 40 of the first circuit 37 and with, and to delimit with the annular part 48 at least one second fluidic connecting channel 56, 58 of the first conduit 44 of the second circuit 42 with the second conduit 46 of the second circuit 42, the second connecting channel 56, 58 being fluidically independent of the first connecting channel 55.

Figure 7:
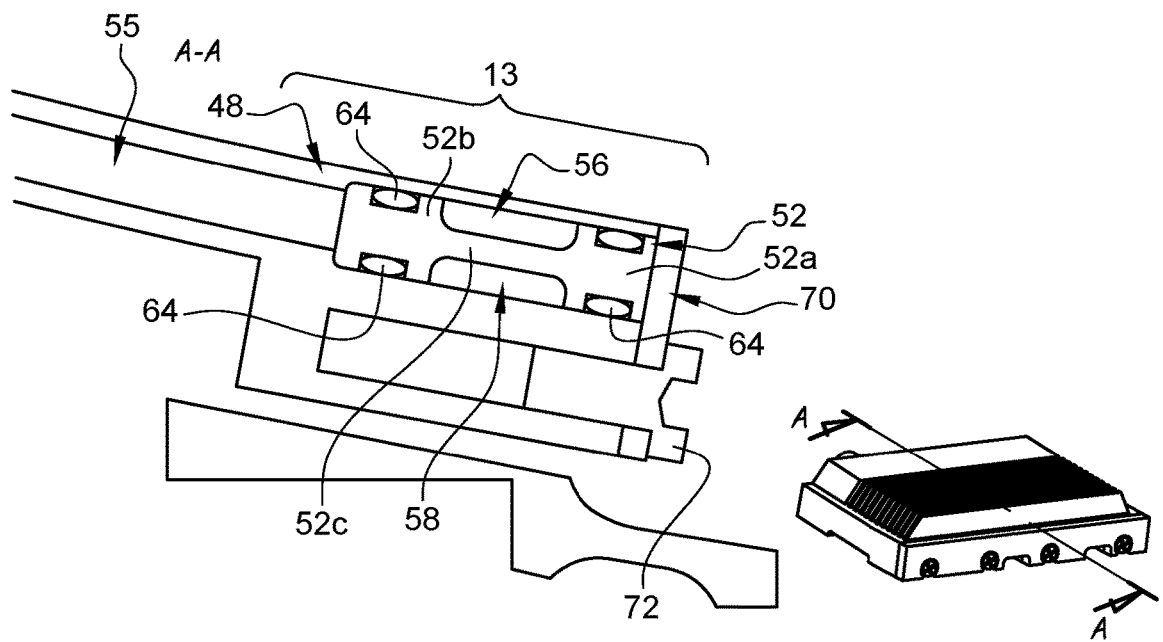
FIG. 7 is a schematic view of the first end of the heat exchanger according to the invention in a sectional plane perpendicular to the longitudinal axis as illustrated by the inset arrows A.
Figure 8:
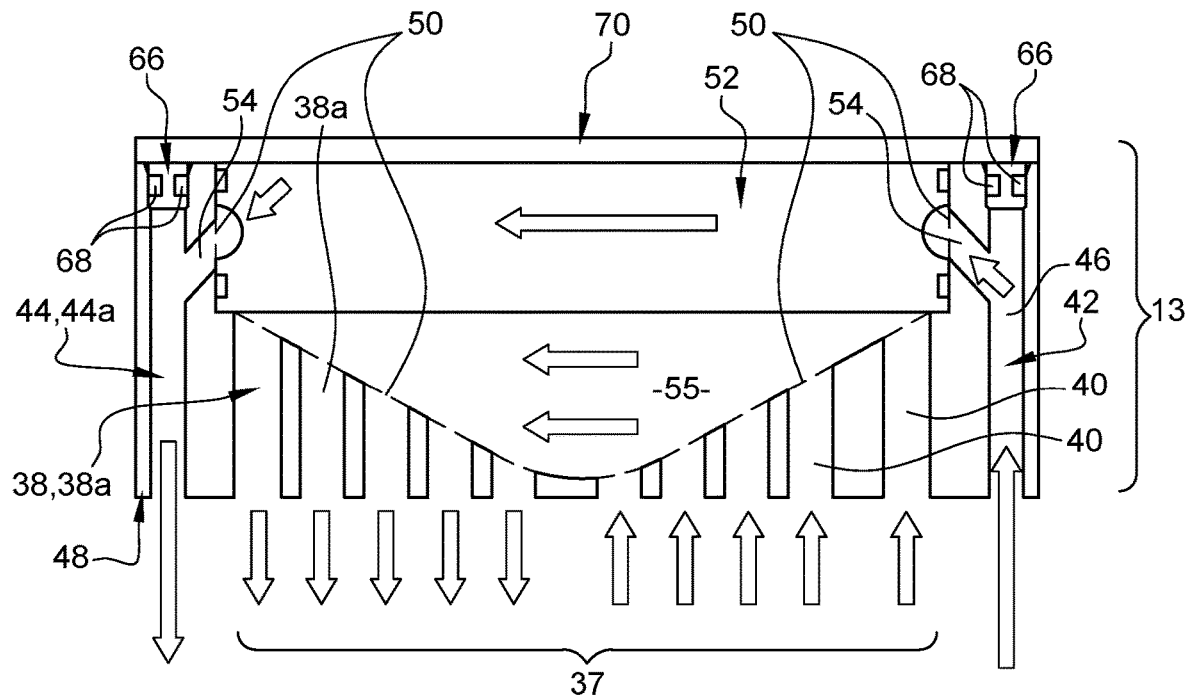
FIG. 8 is a schematic sectional view of said first end of the heat exchanger, the oil circulation being illustrated.

In order to understand how the first sealing member 52 partly delimits the first connecting channel 55 and the second connecting channel 56, 58, we will now describe it. In particular, this one, shown in FIG. 5A, has an elongated shape in the longitudinal direction. In the circumferential direction, it comprises a first part 52a and a second part 52b which are substantially identical to each other and symmetrical to each other with respect to the median plane which is in position in the turbomachine a radial plane. The first part 52a and the second part 52b are connected to each other by a substantially flat connecting wall 52c which extends in a direction perpendicular to the longitudinal direction. The first part 52a and the second part 52b each comprise an annular groove 62 in which an annular seal 64 is mounted (FIGS. 5A and 7).

The first sealing member 52 is mounted as a seal in cavity 50 of the annular part, with the ring seals 64 mounted in grooves 62. The end face of the first section 52a of the first organ 52 facing and at a distance from the outlets of the first sections 38a of the first ducts 38 and the outlets of the second ducts 40 forms an oil flow face in the first connecting channel 55. Also, the first sealing member 52 is dimensioned and the holes 54 are positioned on the annular part 48 in such a way that hole 54 of the second portion 44a of the first conduit 44 and hole 54 of the second conduit 46 open into the second connecting channel 56, 58. Specifically, it can be seen that each hole 54 is fluidly connected to two substantially parallel second connecting channels 56, 58, with the connecting wall 52c of the first sealing member 52 radially separating the two second connecting channels 56, 58. It can also be seen that the seals 64 provide a fluid seal between the first circuit 37 and the second circuit 42.

Second sealing elements 66 are inserted, at the first end 13, in the outlet of the second portion 44a of the first conduit 44 of the second circuit 42 and in the outlet of the second conduit 46 of the second circuit 42. Each of the second sealing elements 66 comprises an annular groove 68 in which a seal 68 is mounted in a similar manner to that described with reference to the first organ 52, the function being identical.

In order to keep the first sealing element 52 and the second sealing elements 66 in position despite the oil pressure, a plate 70 is applied to these elements at the circumferential end face. This plate is screwed into the ring section with screws 72.

The invention claimed is:

1. An annular heat exchanger with a longitudinal axis for a turbomachine, comprising:
a one-piece annular part comprising a first fluidic circuit comprising a first conduit and a second conduit extending annularly and a second fluidic circuit comprising a third conduit and a fourth conduit extending annularly and arranged in a direction perpendicular to the longitudinal axis on either side of the first conduit and second conduit of the first circuit wherein the first and second conduits of the first circuit and the third and fourth conduits of the second circuit open at a first end of said annular part into a cavity which opens in a circumferential direction and into which is inserted a first sealing member which is shaped so as to:
delimit with the annular part at least a first channel for fluidic connection of the first conduit of the first circuit with the second conduit of the first circuit, and
delimit with the annular part at least one second channel for fluidic connection of the third conduit of the second circuit with the fourth conduit of the second circuit, the second channel being fluidically independent of the first channel.

2. The annular heat exchanger according to claim 1, in which the first sealing member comprises external grooves in which sealing gaskets are engaged.

3. The annular heat exchanger according to claim 1, in which the first sealing member comprises a wall extending in the direction perpendicular to the longitudinal axis and delimiting with the annular part two parallel second connecting channels.

4. The annular heat exchanger according to claim 3, wherein one of the two second connecting channels is arranged radially outside the other of the two second connecting channels, which are fluidly separated from each other by the wall of the first sealing member.

5. The annular heat exchanger according to claim 4, in which the first sealing member is locked in the cavity by a plate applied at a circumferential end of said annular part.

6. The annular heat exchanger according to claim 1, in which the third and fourth conduits of the second fluidic circuit are closed off by second members.

* * * * *